US010437506B2

(12) United States Patent
Koppolu et al.

(10) Patent No.: US 10,437,506 B2
(45) Date of Patent: Oct. 8, 2019

(54) OPTIMAL STORAGE AND WORKLOAD PLACEMENT, AND HIGH RESILIENCY, IN GEO-DISTRIBUTED CLUSTER SYSTEMS

(71) Applicant: MICROSOFT TECHNOLOGY LICENSING, LLC, Redmond, WA (US)

(72) Inventors: Lokesh Srinivas Koppolu, Redmond, WA (US); David Allen Dion, Bothell, WA (US); Abhinit Kumar, Bellevue, WA (US); Suresh Chandra Pippari, Redmond, WA (US); Amitabh Tamhane, Redmond, WA (US); Elden Christensen, Sammamish, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 0 days.

(21) Appl. No.: 14/968,888

(22) Filed: Dec. 14, 2015

(65) Prior Publication Data

US 2017/0052707 A1  Feb. 23, 2017

Related U.S. Application Data

(60) Provisional application No. 62/206,235, filed on Aug. 17, 2015.

(51) Int. Cl.
 *G06F 11/00* (2006.01)
 *G06F 3/06* (2006.01)
 (Continued)

(52) U.S. Cl.
 CPC .......... *G06F 3/065* (2013.01); *G06F 3/0619* (2013.01); *G06F 3/0683* (2013.01); *G06F 9/505* (2013.01);
 (Continued)

(58) Field of Classification Search
 CPC ...... G06F 9/5077; G06F 9/505; G06F 9/5083; G06F 2209/503; G06F 2209/4557; G06F 9/5088; G06F 11/2035; G06F 11/3433
 See application file for complete search history.

(56) References Cited

U.S. PATENT DOCUMENTS 6,526,521 B1 * 2/2003 Lim .................... G06F 11/2035
   709/239
8,296,599 B1 * 10/2012 Boyer .................. G06F 11/203
   714/4.11

(Continued)

OTHER PUBLICATIONS

European Patent Office, Officer E. Archontopoulos, PCT International Search Report and Written Opinion for Application No. PCT/US2016/047123, dated Feb. 1, 2017, 20 Pages, Netherlands.

(Continued)

*Primary Examiner* — Bryce P Bonzo
*Assistant Examiner* — Jeison C Arcos
(74) *Attorney, Agent, or Firm* — Buckley, Maschoff & Talwalkar LLC

(57) ABSTRACT

Technologies for cluster systems that are natively geo-site-aware. Such a cluster system makes use of this awareness to determine the subsets of nodes located at various geo-sites at physical configuration, to optimize workload placement based on the geo-sites, to make failover and failback decisions based on the geo-sites, and to assign voting and prune nodes for quorum management based on the geo-sites. Such capabilities result in cluster systems that are more resilient and more efficient in terms of resource usage than cluster systems without such native geo-site awareness.

17 Claims, 6 Drawing Sheets

(51) Int. Cl.
  *G06F 9/50*         (2006.01)
  *G06F 11/20*        (2006.01)
(52) U.S. Cl.
  CPC .......... *G06F 9/5061* (2013.01); *G06F 9/5072* (2013.01); *G06F 11/2094* (2013.01); *G06F 2209/502* (2013.01)

(56) References Cited

U.S. PATENT DOCUMENTS

| | | | |
|---|---|---|---|
| 8,316,110 | B1 | 11/2012 | Deshmukh et al. |
| 8,498,967 | B1 | 7/2013 | Chatterjee |
| 8,606,922 | B1 | 12/2013 | Greenfield |
| 2004/0078654 | A1 | 4/2004 | Holland et al. |
| 2005/0102387 | A1* | 5/2005 | Herington ........... H04L 67/1008 709/223 |
| 2007/0094665 | A1* | 4/2007 | Jackson ................ G06F 9/50 718/104 |
| 2007/0294363 | A1 | 12/2007 | Friedrich |
| 2008/0091806 | A1 | 4/2008 | Shen |
| 2008/0183876 | A1* | 7/2008 | Duvur ................ H04L 67/1008 709/228 |
| 2008/0196029 | A1* | 8/2008 | Doty .................... G06F 9/4856 718/101 |
| 2009/0037367 | A1* | 2/2009 | Wein ..................... G06F 9/5061 |
| 2009/0307166 | A1 | 12/2009 | Routray et al. |
| 2010/0211956 | A1* | 8/2010 | Gopisetty ............. G06F 9/5088 718/104 |
| 2011/0018998 | A1* | 1/2011 | Guzik ................... H04N 21/21 348/143 |
| 2011/0099420 | A1 | 4/2011 | MacDonald McAlister |
| 2012/0089726 | A1* | 4/2012 | Doddavula ............. H04L 67/34 709/224 |
| 2012/0179817 | A1* | 7/2012 | Bade ........................ G06F 8/61 709/225 |
| 2012/0297238 | A1* | 11/2012 | Watson ............... G06F 11/3442 714/4.11 |
| 2012/0330769 | A1* | 12/2012 | Arceo .................... G06Q 20/32 705/21 |
| 2013/0067188 | A1 | 3/2013 | Mehra et al. |
| 2013/0073716 | A1 | 3/2013 | DeJana |
| 2013/0185667 | A1 | 7/2013 | Harper et al. |
| 2013/0297596 | A1* | 11/2013 | Mouline ............. H04L 67/1008 707/724 |
| 2014/0082128 | A1 | 3/2014 | Beard |
| 2014/0089511 | A1 | 3/2014 | McLean |
| 2014/0101300 | A1* | 4/2014 | Rosensweig .......... G06F 9/5072 709/223 |
| 2014/0149784 | A1* | 5/2014 | Ngo .................... H04L 67/1008 714/4.11 |
| 2015/0100589 | A1* | 4/2015 | Hassan .................. H04W 4/02 707/748 |
| 2015/0186226 | A1 | 7/2015 | Oppermann |
| 2015/0269624 | A1* | 9/2015 | Cheng ................ G06Q 30/0267 705/14.58 |
| 2017/0169097 | A1* | 6/2017 | Petri ................. G06F 17/30345 |

OTHER PUBLICATIONS

"Designing Your Cloud Infrastructure", Microsoft TechNet, 57 pages, Updated: Sep. 19, 2012.
"What's New in Failover Clustering in Windows Server", Microsoft TechNet, 22 pages, Updated: Jul. 3, 2014.
European Patent Office, Officer E. Archontopoulos, PCT Written Opinion for Application No. PCT/US2016/047123, Jul. 6, 2017, 8 pages, Netherlands.
"International Preliminary Report on Patentability Issued in PCT Application No. PCT/US2016/047123", dated Feb. 26, 2018, 10 Pages.
"Non Final Office Action Issued in U.S. Appl. No. 15/915,618", dated Jun. 27, 2019, 14 Pages.

* cited by examiner

OPTIMAL STORAGE AND WORKLOAD PLACEMENT, AND HIGH RESILIENCY, IN GEO-DISTRIBUTED CLUSTER SYSTEMS

RELATED APPLICATION(S)

This application claims benefit of U.S. Provisional Application No. 62/206,235 that was filed on Aug. 17, 2015, and that is incorporated herein by reference in its entirety.

SUMMARY

The summary provided in this section summarizes one or more partial or complete example embodiments of the technologies described herein in order to provide a basic high-level understanding to the reader. This summary is not an extensive description of the technologies and it may not identify key elements or aspects of the technologies, or delineate the scope of the technologies. Its sole purpose is to present various aspects of the technologies in a simplified form as a prelude to the detailed description provided below. The technologies as a whole shall not be limited to any particular embodiment(s) or example(s) or combination(s) therefore provided herein.

Customers deploy cluster systems across different geographical locations ("geo-sites") for both disaster recovery and higher resiliency as well as to ensure co-location of a geo-site to the customers (while using other geo-sites for backup/disaster recovery). But today's clustering systems an unaware of geo-locations. That is, they do not natively recognize which subset of cluster nodes is located at one physical location and which subsets of nodes are located at other physical locations. Instead, administrators must manually specify such node subsets and, even then, the cluster system does not use this information intelligently (or even at all) in cluster configuration, workload placement, or pruning for dynamic quorum maintenance.

For example, when workloads get distributed across the cluster nodes based on conventional factors like CPU or memory utilization, the resulting workload distribution can be very inefficient from a geo-site perspective, especially when a client is located at one geo-site, the client's workload in placed at a distant geo-site, and the workload's storage is placed at yet another distant geo-site. Ideally we would like the clients, workloads and the storage to be at the same geo-site so that network traffic does not have to go across geo-sites. Usually bandwidth across geo-sites is more expensive and also more prone to link and router/switch failures.

This invention encompasses technologies for cluster systems that are natively geo-site-aware. Such a cluster system makes use of this awareness to determine the subsets of nodes located at various geo-sites at physical configuration, to manage the placement of workloads based on the geo-sites, to make failover and failback decisions based on the geo-sites, and to prune nodes for quorum management based on the geo-sites. Such capabilities result in cluster systems that are more resilient and more efficient in terms of resource usage than cluster systems without such native geo-site awareness.

DESCRIPTION OF THE DRAWINGS

The detailed description provided below will be better understood when considered in connection with the accompanying drawings, where.

DETAILED DESCRIPTION

The detailed description provided in this section, in connection with the accompanying drawings, describes one or more partial or complete example embodiments of the technologies, but is not intended to describe all possible embodiments of the technologies. This detailed description sets forth various examples of at least some of the systems and/or methods of the technologies. However, the same or equivalent technologies, systems, and/or methods may be realized according to examples as well.

Computing Environments

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
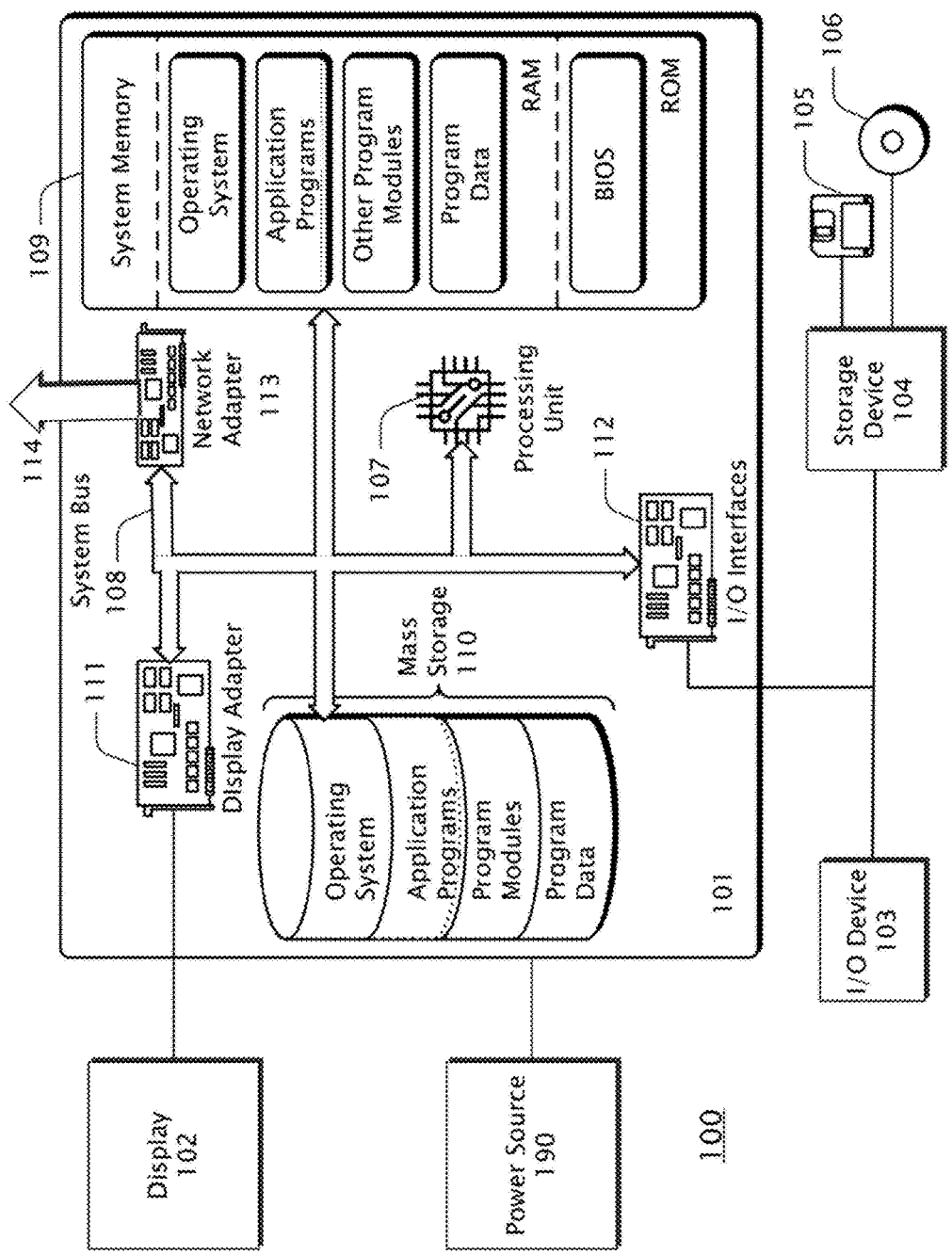
FIG. 1 is a block diagram showing an example computing environment 100 in which the technologies described herein may be implemented.

FIG. 1 is a block diagram showing an example computing environment 100 in which the technologies described herein may be implemented. A suitable computing environment may be implemented with any of numerous general purpose or special purpose devices and/or systems. Examples of such devices/systems include, but are not limited to, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes at least one computing device 101 coupled to various components, such as peripheral devices 102, 103, 101 and the like. These may include components such as input devices 103 such as voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like. The term "computing device" as used herein, unless preceded with the word "virtual", refers strictly to a physical article(s) of manufacture or the like. The terms "virtual computing device" and "virtual machine" typically refer to an emulation of a particular computing system and are commonly referred to as a virtual machine ("VM"). These terms are used broadly to include operating-system-level virtualization ("containers") where, in one example, the kernel of an operating system allows for multiple isolated user-space instances, instead of just one, and where, in another example, both the kernel and the user-space are isolated. Such VMs, to be operational, are ultimately hosted on a non-virtual computing device(s).

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107. The term "system memory" as used herein refers strictly to a physical article(s) of manufacture or the like.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like. The term "mass storage device" as used herein refers strictly to a physical article(s) of manufacture or the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor(s) 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may include only a few of the components described in connection with FIG. 1. For example, an electronic badge may be comprised of a coil of wire or the like along with a simple processing unit 107 or the like, the coil configured to act as power source 190 when in proximity to a card reader device or the like. Such a coil may also be configured to act as an antenna coupled to the processing unit 107 or the like, the coil antenna capable of radiating/receiving communications between the electronic badge and another device such as a card reader device. Such communications may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic device such as a ROM. The term "software" generally refers to computer-executable instructions, code, data, applications, programs, program modules, or the like maintained in or on any form or type of computer-readable media that is configured for storing computer-executable instructions or the like in a manner that is accessible to a computing device. The terms "computer-readable medium", "computer-readable media", and the like as used herein are limited to referring strictly to one or more statutory apparatus, article of manufacture, or the like that is not a signal or carrier wave per se. The term "computing device" as used in the claims is limited to referring strictly to one or more statutory apparatus, article of manufacture, or the like that is not a signal or carrier wave per se, such as computing device 101 that encompasses client devices, mobile devices, one or more servers, network services such as an Internet services or corporate network services based on one or more computers, and the like, and/or any combination thereof.

The term "cluster node" or "node" or the like refers to a physical resource such as computing device 101 or the like that is configured as part of a cluster system. Such a node typically executes particular cluster node software. A cluster system typically comprises a plurality of such physical cluster nodes, some of which may be physically located at one site and others of which may be physically located at one or more other sites. Such physical sites are typically physically and geographically distinct and are referred to herein as "geo-sites". For example, several example nodes A-C of example an cluster are physically located at a geo-site A in Seattle while other example nodes D-F of the same cluster are physically located at a geo-site B in Dallas (e.g., see FIG. 6). The term "cluster system" and the like as used herein typically refers to a conventional failover cluster system or the like that includes the various novel and unique geo-site enhancements of the present invention. The term "cluster environment" as used herein typically refers to an environment in which a cluster system according to the present invention operates, where the environment includes the various elements, services, data, and/or other resources required for the geo-site enhancements to function as required.

Nodes and workloads of a cluster system typically utilize at least two kinds of "storage": file shares and cluster shared volumes ("CSV"). The term "share" and "file share" as used herein typically refer to a conventional file share. In general, cluster nodes (and any VMs operating on the cluster node) can access file shares given the appropriate configuration (e.g., establishing drive mappings or the like). The term "cluster shared volume" as used herein typically refers to a shared storage device that is accessible to all nodes. In one example, virtual hard disks ("VHDs") for virtual machines ("VM") are created or copied to (hosted on) a CSV. Multiple VHDs can be placed on a CSV that in turn are associated with multiple VMs which can be running on different nodes of a cluster. The term "dependent storage" as used herein refers to particular storage that a particular VM or other workload depends on, such as a particular CSV or file share or the like, or a particular VHD hosted on a particular CSV(s) or file share(s) or the like.

The term "workload" as used herein typically refers to a client application(s) that is hosted on a cluster system. Such client applications include, but are not limited to, virtual machines ("VMs"), storage such as CSVs and file shares, hosted client applications of any kind, and any combination of the foregoing, also referred to herein as "virtual resources". Non-limiting examples of some client applications that a client may desired to have hosted on a cluster system include database applications (e.g., SQL Server), email services, storage services (e.g., archival and backup services), accounting packages, web sites, office suites, and any other software or services or functionality or the like that can be hosted on a cluster system. To be "hosted" means that a client's workload is made operational and available by the cluster system on behalf of the client and according to the client's requirements. The term "group" as used herein in the context of workloads typically refers to a particular hosted workload—that is, a particular workload that is being hosted by a cluster system. A workload that depends on particular storage (which may be a, or part of a, different workload) is said to have "storage affinity" to that storage. If that particular storage is hosted on a particular geo-site, then that geo-site is said to be a "storage affinity site" with respect to that workload.

The nodes of a cluster may be either "online" or "offline". The term "online", when applied to a cluster node (or witness or the like), indicates that the node is currently operating as part of the cluster. The term "offline", when applied to a cluster node (or witness or the like), indicates that the node is not currently operating as part of the cluster. An offline node may have failed due to some fault (i.e., an "unplanned failure") and is thus known to be "unplanned offline", or the offline node may be intentionally taken offline such as according to some plan (e.g., planned maintenance or the like) and is thus known as "planned offline".

Figure 2:
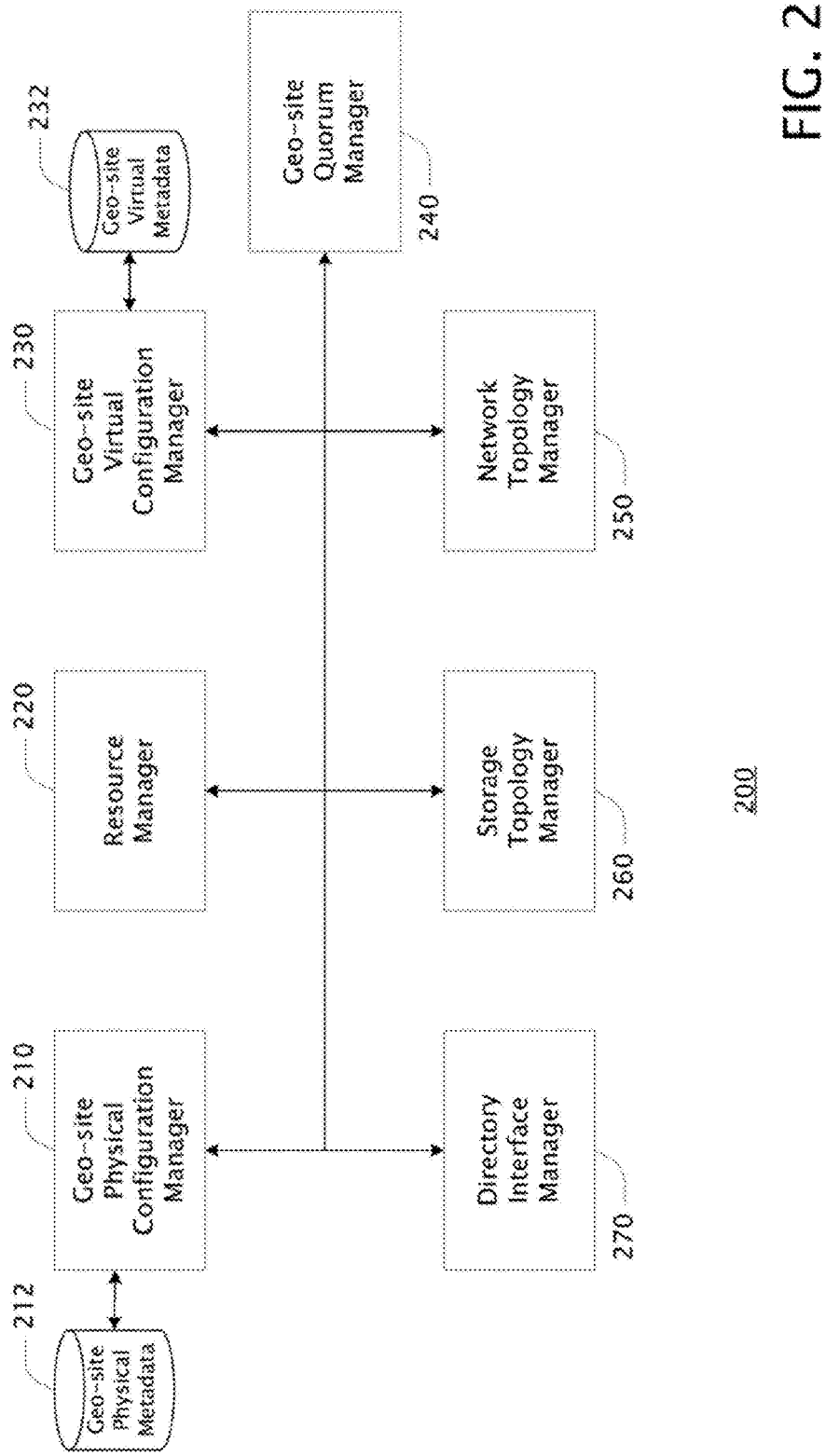
FIG. 2 is a block diagram of example system 200 configured for implementing aspects of the instant invention.

FIG. 2 is a block diagram of example system 200 configured for implementing aspects of the instant invention. System 200 typically includes several components including geo-site physical configuration manager ("GPCM") 210, resource manager ("RM") 220, geo-site virtual configuration manager ("GVCM") 230, geo-site quorum manager ("GQM") 240, network topology manager ("NTM") 250, storage topology manager ("STM") 260, directory interface manager ("DIM") 270. Each of these components (including any sub-components) may be implemented as a system comprising a hardware logic device (e.g., an integrated circuit or a device comprising such circuits), a computing device(s) (such as described in connection with FIG. 1 or the like) that, based on execution of particular instructions, is configured to perform the requisite method(s), a service comprising a set of devices (including one or more of the computing devices such as described in connection with FIG. 1 or the like), or as some combination of the foregoing. Each such component may be implemented on/by one device, such as a hardware logic device or computing device, or across multiple such devices. For example, a component may be implemented in a distributed fashion on/by multiple devices such as, for example, servers or elements of a network service or web site or the like. Further, each such component (including any sub-components) may encompass one or more sub-components or the like, and the components may be implemented as separate components, or any two or more may be combined in whole or in part. The division of components described herein is non-limiting except where indicated, and is intended primarily to aid in describing aspects of the invention.

In one example, system 200 is configured for discovering and managing the physical configuration of a cluster that is aware of its geo-sites, managing and optimizing the virtual configuration of the cluster based on its geo-sites, including the allocation and distribution of VMs and VHDs within the cluster, and managing quorum based on the cluster's geo-sites. One challenge addressed by system 200 in providing geo-site awareness to cluster systems and aspects of clustering is to optimize cluster resources and the allocation and distribution of virtual resources based on an awareness of geo-sites. That is, by knowing which cluster nodes (and thus which physical and virtual resources) are located at which geo-sites, a clustering system can more efficiently manage quorum as well as more efficiently place workloads among the cluster nodes and other physical resources.

For example, a cluster may have some nodes located at one geo-site in Seattle where on client (e.g., cluster user) is located and other nodes located at a geo-site in Dallas where another client is located. Given awareness of these geographical locations and which nodes are located at which location, the cluster system can manage quorum and optimize placement of workloads for the clients and for most efficient operation of the physical and virtual resources. Without such innate geo-site awareness, cluster systems make decisions that often negatively impact the optimal use of resources, particular when dealing with failover scenarios and the like. The term "preferred site" as used herein refers to one of a cluster's geo-sites that is set as the cluster's preferred site for hosting workloads. In another example, the geo-sites of a cluster may be listed in an order of preference (e.g., on a cluster's preferred site list). In this manner, if the current preferred site goes down, the next geo-site on the list becomes the new preferred site. Alternatively or additionally, workloads may be associated with a particular geo-site that is set as the workload's preferred geo-site or a list of geo-sites ordered by preference. In this example, the preferred site concept is workload-centric as opposed to cluster-centric.

Further, each geo-site may have a "preferred node", the node of the geo-site that is preferred for hosting workloads. In another example, the nodes of a geo-site may be listed in an order of preference (e.g., on a geo-site's preferred node list). In this manner, if the current preferred node goes down, the next node on the list becomes the new preferred node. Alternatively or additionally, workloads may be associated with a particular preferred node or a list of nodes ordered by preference. In this example, the preferred node concept is workload centric as opposed to cluster system centric.

Geo-site physical configuration manager ("GPCM") 210 may be a component of system 200 or may be a separate and/or pre-existing component of a cluster environment that is utilized by system 200. In one example, GPCM 210 is a component of system 200. GPCM 210 typically deduces the geo-sites of a cluster and identifies the physical cluster resources (e.g., nodes, and storage) located at each geo-site. In one example, "geo-site physical metadata" includes information describing the determined geo-sites as well as the physical cluster resources identified at each geo-site. In this example, geo-site physical metadata is stored in geo-site physical database 212 or the like, which may be part of or separate from GPCM 210. The functionality of GPCM 210 is described in more detail below in connection with FIG. 3.

Resource manager ("RM") 220 may be a component of system 200 or may be a separate and/or pre-existing component of a cluster environment that is utilized by system 200. In one example, RM 220 is a separate and/or pre-existing component. RM 220 typically manages the placement of workloads among the physical resources of a cluster. For example, RM 220, based on its awareness of the various physical resources of the cluster, places VMs and CSVs among those physical resources. In the event of a failure of some physical resource (such as a node or storage), RM 220 re-allocates the virtual resources impacted by the failure in order to maintain continuous and efficient operation of the virtual resources to the greatest degree possible. But RM 220 of itself has no awareness of geo-sites or the distribution of physical resources at those geo-sites.

Geo-site virtual configuration manager ("GVCM") 230 may be a component of system 200 or may be a separate and/or pre-existing component of a cluster environment that is utilized by system 200. GVCM 230 may be a subcomponent of RM 220 or, alternatively, may supplement the operating of RM 220. In one example, GVCM 230 is a component of system 200 that supplements the operation of RM 220. GVCM 230 typically influences or controls, based in its awareness of the cluster's geo-sites and the cluster's physical resources at each geo-site, the allocation of VMs and VHDs among those physical resources. Further, in the event of a failure of some physical resource (such as a node or storage), GVCM 230 influences or controls the re-placement of the workloads impacted by the failure in order to maintain continuous and efficient geo-site-aware operation of the virtual resources to the greatest degree possible. In one example, "geo-site virtual metadata" includes information describing information use to influence of control the allocation and/or re-allocation of virtual resources. In this example, geo-site virtual metadata is stored in geo-site virtual database 232 or the like, which may be part of or separate from GPCM 210. The functionality of GVCM 230 is described in more detail below in connection with FIG. 4.

Geo-site quorum manager ("GQM") 240 may be a component of system 200 or may be a separate and/or pre-existing component of a cluster environment that is utilized by system 200. In one example, GQM 240 is a component of system 200. GQM 240 may be a subcomponent of a cluster quorum manager or, alternatively, may supplement the operation of a cluster quorum manager. GQM 240 typically influences or controls, based in its awareness of the cluster's geo-sites and the cluster's physical resources at each geo-site, how, and with what nodes, quorum is established for a cluster. The functionality of GQM 240 is described in more detail below in connection with FIG. 5.

Network topology manager ("NTM") 250 may be a component of system 200 or may be a separate and/or pre-existing component of a cluster environment that is utilized by system 200. In one example, NTM 250 is a separate and/or pre-existing component. In this example, NTM 250 typically discovers and/or manages network topology metadata regarding the nodes of a cluster. In one example, the "network topology metadata" identifies each node of the cluster, the relationships between the nodes, the network latency between each node and every other node, the relationships between subnets of different NICs of a node, etc. Network topology metadata may be maintained in a database(s) or the like that is part of or separate from NTM 250.

Storage topology manager ("STM") 260 may be a component of system 200 or may be a separate and/or pre-existing component of a cluster environment that is utilized by system 200. In one example, STM 260 is a separate and/or pre-existing component. In this example, STM 250 typically discovers and/or manages storage topology metadata regarding the storage of a cluster. In one example, this "storage topology metadata" identifies each storage (e.g., CSVs and file shares) of the cluster, the relationship between each storage and every cluster node, the network latency between each storage and every cluster node, whether or not storage is directly connected to one or more nodes, etc. Storage topology metadata may be maintained in a database(s) or the like that is part of or separate from STM 260.

Directory interface manager ("DIM") 270 may be a component of system 200 or may be a separate and/or pre-existing component of a cluster environment that is utilized by system 200. In one example, DIM 270 is a separate and/or pre-existing component. In general, DIM 270 interfaces with existing network directories to obtain "directory metadata" that describes the configuration of the network(s) in which system 200 operates. Such directory metadata typically provides additional information about the network and storage resources of the cluster environment in which system 200 operates, the colocation of nodes in different geo-sites, etc.

Figure 3:
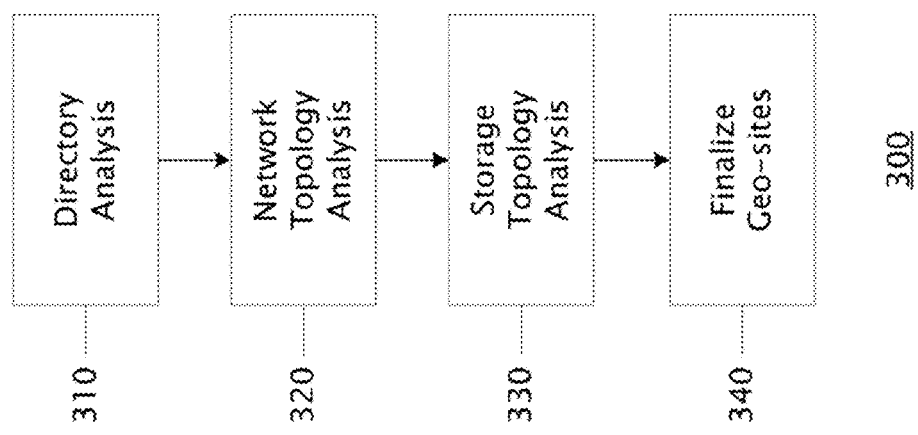
FIG. 3 is a block diagram showing an example method 300 for deducing the geo-site of a cluster and identifying the physical cluster resources (e.g., nodes, and storage) located at each geo-site.

FIG. 3 is a block diagram showing an example method 300 for deducing the geo-site of a cluster and identifying the physical cluster resources (e.g., nodes, and storage) located at each geo-site. In one example, method 300 is performed by geo-site physical configuration manager ("GPCM") 210 based at least in part on metadata obtained from various components of system 200. In some examples, various steps of method 300 may be performed in a different order than that shown. Method 300 typically begins at block 310.

Block 310 of method 300 typically indicates analyzing directory information with respect to a cluster, such as directory metadata obtained by DIM 270. In one example, directory sites may be configured on domain controllers. Such a site configuration may be reflected in the directory metadata and may reflect the relationship between cluster nodes, domain controllers and directory sites. The analysis typically evaluates this relationship information. Given such analysis, cluster nodes connected to a domain controller ("DC") that belongs to a particular directory site may be considered co-located at the same proposed geo-site. In one example, the grouping of nodes according to DCs and directory sites forms an initial partitioning of a cluster's nodes into one or more proposed geo-sites. Once the directory analysis is complete, typically resulting in one or more proposed geo-site groupings of the cluster's nodes, method 300 typically continues at block 320.

It should be noted that directory sites, including Active Directory sites, are not the same as geo-sites. For example, an Active Directory site may be defined as a set of well-connected subnets. Active directory sites may represent a physical structure of a network, while domains may represent a logical structure of an organization making use of the network. But such Active Directory physical structure representations are not required, and typically do not, align with or expose the various physical geographic locations at which physical network resources are located. While it might be possible for network administrators to force directory sites to overlay and reflect geo-sites, such mappings are generally not native to directory sites. For at least these reasons, directory sites, such as Active Directory sites and the like, cannot properly be considered to disclose or suggest geo-sites as described herein. Instead, in some examples, directory sites may be used as a starting point for forming an initial partitioning of a cluster's nodes into one or more proposed geo-sites. This optional initial partitioning is typically further refined based on additional analysis.

Block 320 of method 300 typically indicates analyzing network topology information with respect to a cluster, such as network topology metadata maintained by NTM 250. In one example, subnet information may be used to assign cluster nodes to geo-sites. For example, all nodes that share the same subnet may be grouped into the same proposed geo-site. Or, in another example, when starting with a proposed geo-site, as from block 310, if various of the nodes in that proposed geo-site share more than one subnet, then the proposed geo-site can be divided into as many new proposed geo-sites as there are subnets, where each new proposed geo-site comprises the nodes that share one of the subnets, thus further refining the proposed geo-sites. In one particular example, if two sets of nodes are on 172.16.0.0/19 and 172.17.0.0/19 subnets respectively, and a third set of nodes is on a 193.1.1.0/27 subnet, then instead of creating three different geo-sites, two such sites are created in this example: one with the nodes on the 193 . . . subnet and the other with the nodes on the 172 . . . subnets.

In another example, network latencies from the network topology metadata may be used to create or further refine proposed geo-sites. For example, latencies between node pairs that are physically close together, such as at the same geo-site, tend to be low when compared with latencies between node pairs that are not physically close together. For example, physically co-located node pairs may have network latencies in the tenths of milliseconds, while node pairs that are not physically co-located may have latencies in the tens and hundreds of milliseconds. In such cases, node pairs that share latencies of a similar magnitude ("common latencies") are typically grouped into the same geo-site. Such network topology analysis may be used to further refine proposed geo-sites. Once the network topology analysis is complete, typically resulting in one or more proposed geo-site groupings of the cluster's nodes, or resulting in further refined proposed geo-sites, method 300 typically continues at block 330.

Block 330 of method 300 typically indicates analyzing storage topology information with respect to a cluster, such as storage topology metadata maintained by STM 260. In one example, subnet information may be used to assign cluster storage to geo-sites. For example, all storage that share a subnet with one or more nodes may be grouped into the same geo-site as those nodes.

In another example, network latencies from the storage topology metadata may be used to create or further refine proposed geo-sites. For example, latencies between node-storage pairs that are physically close together, such as physically located at the same geo-site, tend to be low when compared with latencies between node-storage pairs that are not physically close together. For example, physically co-located node-storage pairs may have network latencies in the tenths of milliseconds, while node-storage pairs that are not physically co-located may have latencies in the tens and hundreds of milliseconds. In such cases, node-storage pairs that share latencies of a similar magnitude ("common latencies") are typically grouped into the same geo-site. Such storage topology analysis may be used to further refine proposed geo-sites. Once the storage topology analysis is complete, typically resulting in one or more proposed geo-site groupings of the cluster's nodes and storage, or resulting in further refined proposed geo-sites, method 300 typically continues at block 340.

Block 340 of method 300 typically indicates finalizing the proposed geo-sites resulting from the previous steps of method 300. In one example, this is done automatically by GPCM 210 recording the final proposed geo-sites as geo-site physical metadata in geo-site physical database 212 or the like. In another example, an administrator of system 200 may override or manual adjust the resulting proposed geo-sites, possibly re-assigning one or more node or storage from one geo-site to another. The term "geo-site" also refers to an organizational structure/object of a cluster system that is based on and associated with the geo-site physical metadata. Such a "geo-site" or "geo-site object" typically includes data identifying the physical cluster resources associated with it; e.g., the physical resources located at the physical geo-site. Once the proposed geo-sites are finalized and recorded, method 300 is typically complete.

Figure 4:
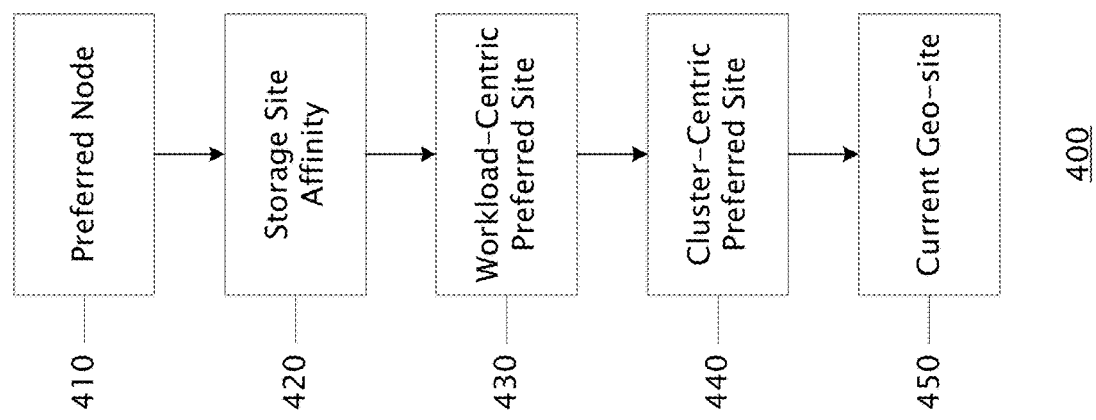
FIG. 4 is a block diagram showing an example method 400 for placement and/or failover of a group (a hosted workload) in a geo-site aware cluster system, such as cluster system 600.

FIG. 4 is a block diagram showing an example method 400 for placement and/or failover of a group (a hosted workload) in a geo-site aware cluster system, such as cluster system 600. In one example, method 400 is performed by geo-site virtual configuration manager ("GVCM") 230 based at least in part on metadata, such as geo-site physical metadata, obtained from various components of system 200. In one example, when a new workload is brought online, it is "placed" on a particular node (i.e., hosted on the particular node). Such "placement" of a workload is typically according to method 400. In another example, when a node hosting a workload fails, a failover of the group (hosted workload) occurs, typically according to method 400. The illustrated order of the steps of method 400 represent a particular ranking of the order of the steps. In some examples, various steps of method 400 may be performed in a different order than that shown according to a different ranking. Method 400 typically begins at block 410 in the event of a failover.

Block 410 of method 400 typically indicates a group placement and/or failover to a preferred node (such as a cluster-centric or workload-centric preferred node) in the geo-site hosting the workload, if such a preferred node is set or listed. If not, then method 400 typically continues at block 420.

Block 420 of method 400 typically indicates a group placement and/or failover to a node in a storage affinity site of the hosted workload, if the hosted workload (such as, for example, a VM) depends on particular storage. If not, then method 400 typically continues at block 430.

Block 430 of method 400 typically indicates a group placement and/or failover to an available node in the workload-centric preferred site of the cluster, if such a preferred site is set or listed. If not, then method 400 typically continues at block 440.

Block 440 of method 400 typically indicates a group placement and/or failover to an available node in the cluster-centric preferred site of the cluster, if such a preferred site is set or listed. If not, then method 400 typically continues at block 450.

Block 450 of method 400 typically indicates a group placement and/or failover to some node in the geo-site hosting the workload, if such a node is available. If not, then the group may failover to a different geo-site as further discussed below.

In one example, if the time since the last failover of a group is more than a threshold, then the group failover is targeted according to method 400 as described above. If, on the other hand, the number of failures is greater than a configured value within the threshold time, then failovers of the group may be targeted to another available geo-site in the cluster (a non-preferred geo-site or a next-preferred geo-site in the case of a cluster-centric or workload-centric preferred site list) according to method 400.

In one example, in the event a group is manually moved to a non-preferred site then, on failover, that group remains in the manually-assigned geo-site so long as a node in that geo-site that is available to accept the failover. In the event that no node in the manually-assigned geo-site is available to accept the failover, then the group may failover to a node in a different geo-site according to method 400.

The ranking of the steps of method 400 may be changed by various rankers of a cluster system. For example, a default ranker may rank the steps of method 400 in the order illustrated. In another example, a failover history ranker may rank the order of the steps of method 400 to prefer a node in a geo-site that has experienced the least number of exiting failovers (that is, groups leaving the node due to failover) over all other cluster nodes. In yet another example, a workload ranker may rank the order of the steps of method 400 so as to distribute workloads substantially evenly across the nodes in a geo-site and/or across geo-sites. Other rankers that define other node preferences or ranking schemes may also be provided.

In one example, when dependent storage is moved to another node of a particular geo-site for whatever reason (failover, manual move, placement, etc.), the VMs and workloads that are dependent on that storage are scheduled, typically after a storage stabilization period, to move to some node in the same geo-site. The storage stabilization period is intended to give the dependent storage sufficient time to "stabilize" on its new node before the dependent workloads are moved as well. The storage stabilization period may be established as a fixed time (e.g., 10 minutes) or may be indicted by the dependent storage itself. For example, once the dependent storage is ready (e.g., fully copied and available at its new location), the dependent storage itself, or some other entity (such as the host node or GVCM 230 or the like), may indicate that the storage stabilization period has ended. At this point, workloads that depend on the storage may be moved to some node in the storage's geo-site, typically according to method 400.

In one example, when a previously-failed preferred geo-site or node comes back on-line as part of a cluster, failbacks may be scheduled. For example, a workload that has failed over to a non-preferred or less-preferred geo-site or node (relative to the recently back-on-line preferred geo-site or node) will failback to the back-on-line preferred geo-site or node, typically according to a schedule. In one example, this schedule is based on a geo-site or node stabilization period. The geo-site node stabilization periods may be established as a fixed time (e.g., 10 minutes). In some cases, multiple geo-sites or nodes may come back on-line in the cluster at or about the same time, such as after power or connectivity or the like is restored. Such stabilization periods allow for multiple simultaneously returning geo-sites and/or nodes to come back-on-line and for the most preferred of those geo-sites and/nodes to be determined. At that point, groups for which such a returning geo-site or node is preferred can failback to that geo-site and/or node, typically according to method 400.

Figure 5:
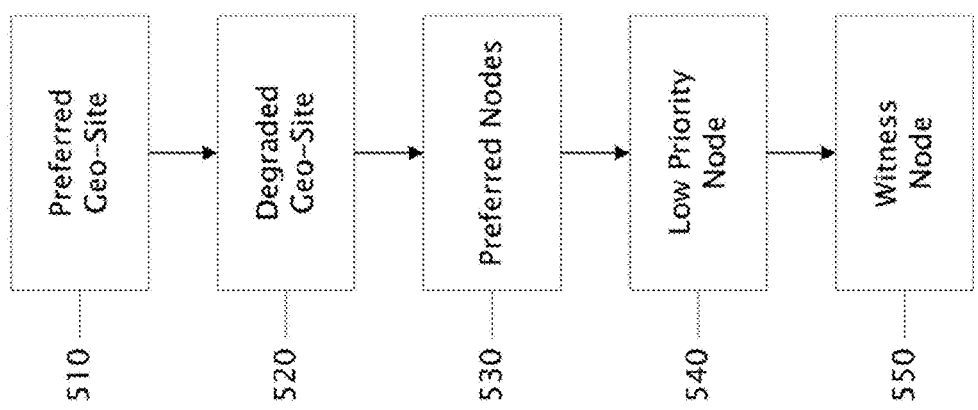
FIG. 5 is a block diagram showing an example method 500 for maintaining quorum by a geo-site aware cluster system.

FIG. 5 is a block diagram showing an example method 500 for maintaining quorum by a geo-site aware cluster system. In one example, method 500 is performed by or in conjunction with geo-site quorum manager ("GQM") 240 based at least in part on metadata, such as geo-site physical metadata and/or geo-site virtual metadata, obtained from various components of system 200. Example method 500 illustrates two distinct and separate geo-site aware dynamic quorum maintenance processes: dynamic weight adjusting and node pruning.

Regarding dynamic weight adjustment, each cluster node may have a vote except for those nodes that are planned offline. Those cluster nodes (including any witness) that are online or unplanned offline may have a vote according to their "dynamic weight"—a property of each node that indicates whether or not the node currently has a vote. In one example, the dynamic weight of each cluster node is controlled by GCM 240 or the like. For example, a cluster's vote count is adjusted by adjusting various nodes' dynamic weight to indicate that particular nodes may or may not vote in quorum decisions. The dynamic weights of nodes are typically adjusted to maintain an odd number of voting nodes for a cluster's quorum maintenance processes. A "target geo-site" is a site that is targeted for adjustment of one or more node dynamic weights. In one example, a dynamic weight of zero indicates that a node cannot currently vote, while a dynamic weight of non-zero indicates that the node can currently vote.

Regarding node pruning, a maintenance process separate and distinct from dynamic weight adjustment, nodes of a cluster may need to be pruned (i.e., removed, at least temporarily) from the cluster. For example, nodes may need to be pruned due to node failure and/or communications failure such as between nodes and/or geo-sites. A pruned node typically does not participate in cluster operations.

The illustrated order of the steps of method 500 represent a particular weight adjusting or pruning order. In some examples, various steps of method 500 may be performed in a different order than that shown according to a different weight adjusting or pruning order. In one example, when nodes need to be weight adjusted or pruned, method 500 typically begins at block 510.

Block 510 of method 500 typically indicates giving preference to nodes in a preferred geo-site when weight adjusting or pruning. For example, regarding node pruning, given communication issues between two geo-sites or nodes between two geo-sites, nodes in the non-preferred (target) site are pruned first. In this example, for geo-sites listed in an order of preference, nodes in the least preferred (target) geo-site may be pruned first. In this manner, nodes in the preferred geo-site are preserved.

Regarding dynamic weight adjusting, given communication issues between two geo-sites or nodes between two geo-sites, nodes in the non-preferred (target) site are weight adjusted to zero first. In this example, for geo-sites listed in an order of preference, nodes in the least preferred (target) geo-site may be weight adjusted to zero first. In this manner, nodes in the preferred geo-site retain voting privileges. If preferred geo-sites are not specified, then method 500 typically continues at block 520.

Block 520 of method 500 typically indicates giving preference to nodes in non-degraded geo-sites when weight adjusting or pruning. For example, regarding node pruning, if geo-sites A and B of FIG. 6 had a good site-to-site communication status, but sites A-C and B-C did not, then nodes from target geo-site C are pruned first. In this manner, geo-sites and nodes in geo-sites that contribute to communications problems are pruned first so as to preserve nodes in geo-sites with good communications statuses.

Figure 6:
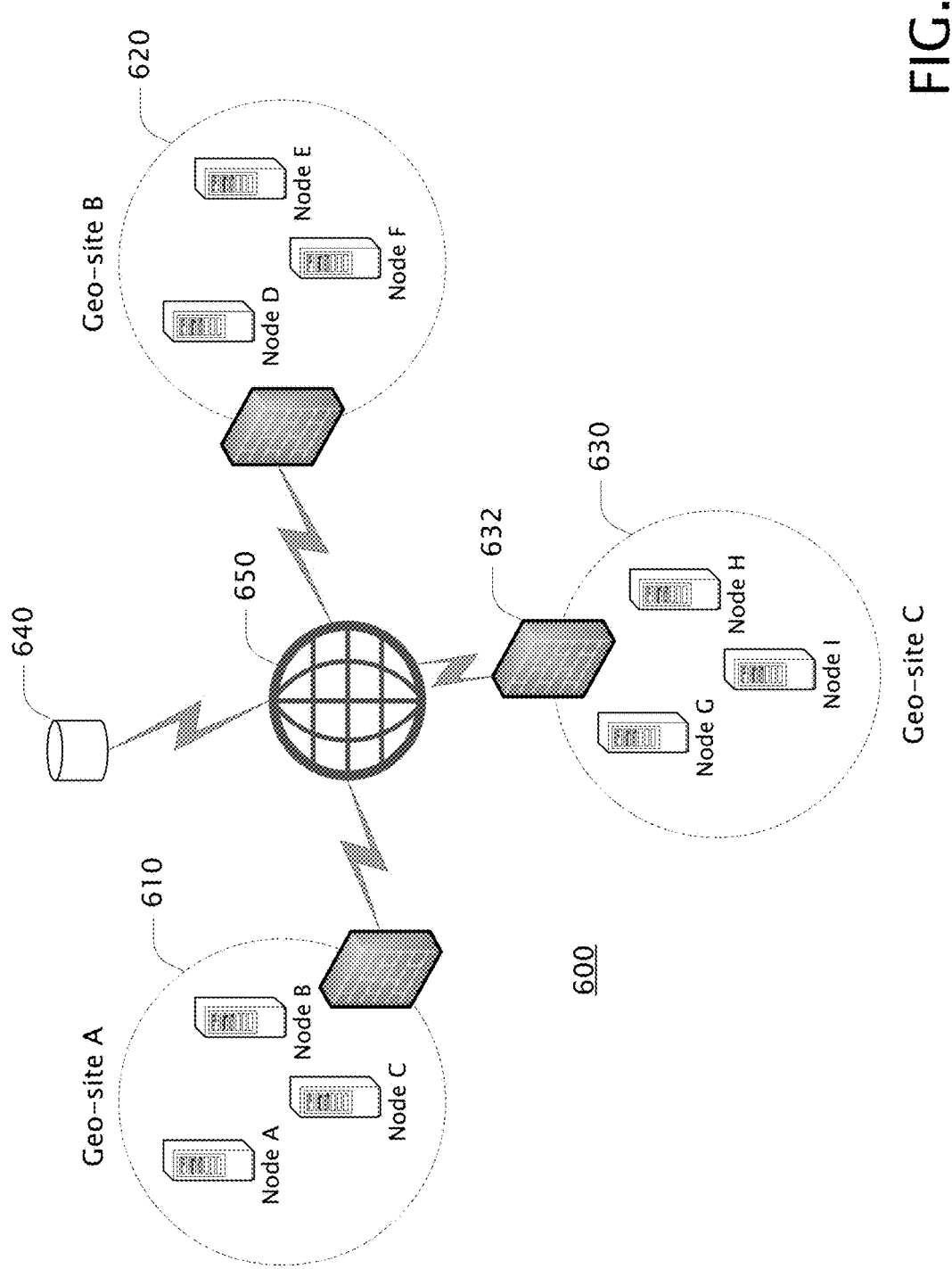
FIG. 6 is a block diagram of an example geo-site aware cluster system 600 comprising three example geo-sites A 610, B 620, and C 630 and an example witness 640.

Regarding dynamic weight adjusting, if geo-sites A and B of FIG. 6 had a good site-to-site communication status, but sites A-C and B-C did not, then nodes from target geo-site C are weight adjusted to zero first. In this manner, geo-sites and nodes in geo-sites that contribute to communications problems are weight adjusted to zero first so as to retain the voting privileges of nodes in geo-sites with good communications statuses.

Block 530 of method 500 typically indicates giving preference to preferred nodes in a target geo-site when weight adjusting or pruning. For example, regarding node pruning, if pruning nodes in a target geo-site, nodes that are not preferred are pruned first. In this example, for nodes listed in an order of preference, the least preferred nodes in the target geo-site may be pruned first. In this manner, preferred nodes are preserved.

Regarding dynamic weight adjusting, if adjusting weights of nodes in a target geo-site, nodes that are not preferred are adjusted to zero first. In this example, for nodes listed in an order of preference, the least preferred nodes in the target geo-site may be adjusted to zero first. If preferred nodes are not specified, then method 500 typically continues at block 540.

Block 540 of method 500 typically indicates giving preference to non-low priority nodes in a target geo-site when weight adjusting or pruning. For example, regarding node pruning, nodes in a target geo-site that are identified as low priority with respect to voting in quorum decisions are pruned first. In this example, for nodes listed in a priority order, the lowest priority nodes in the target geo-site may be pruned first. In this manner, higher priority nodes are preserved.

Regarding dynamic weight adjusting, nodes in a target geo-site that are identified as low priority with respect to voting in quorum decisions are adjusted to zero first. In this example, for nodes listed in a priority order, the lowest priority nodes in the target geo-site may be adjusted to zero first. In this manner, the voting rights of higher priority nodes are preserved.

Block 550 of method 500 typically indicates giving preference to a witness when pruning. For example, the witness is typically not pruned. But, with regarding to dynamic weight adjustment, given a choice between the witness and a node, preference may be given to the node by adjusting the dynamic weight of the witness to zero. In another example, given a witness and two sites, one site with n nodes and the other with n−1 nodes, a node in the site with n nodes may be adjusted to zero thus resulting in an odd number of voting nodes where both sites now have n−1 voting nodes.

FIG. 6 is a block diagram of an example geo-site aware cluster system 600 comprising three example geo-sites A 610, B 620, and C 630 and an example witness 640. In one example, the physical configuration of cluster system 600 is a result of method 300. Each geo-site in this example comprises three nodes, such as example nodes G, H, and I in example geo-site C 630, and is coupled via a geo-site interface, such as example interface 632, to the other geo-sites via some inter-geo-site network(s) such as the Internet 650 and/or some other public and/or private network(s) or the like. In practice, any number of nodes per geo-site may be used. The nodes in each geo-site are typically communicatively coupled to each other, such as over one or more local networks via one or more network interface devices (such as one or more network interface cards ("NICs") or the like) as well as to their respective geo-site interface, such as interface 632 for the nodes of geo-site C 630. In general, a geo-site interface, such as interface 630, is a communications coupling between the nodes of one geo-site and an inter-geo-site network(s) that couples that geo-site to other geo-sites of cluster system 600. Such an interface may include a firewall, modem, access point, router, switch, or any other combination of devices configured to couple the nodes of a geo-site to a network(s) that communicatively couples to the nodes of other geo-sites.

In example cluster system 600, geo-site A 610 may be the preferred site. Alternatively or additionally, from the cluster system's perspective, the geo-sites of cluster 600 may be listed in an order of preference: geo-site A 610, then geo-site B 620, and then geo-site C 630 in this example. In this example, workloads may alternatively or additionally be associated with workload-centric preferred sites or geo-sites listed in an order of preference. Priority between cluster-centric and workload-centric preferred geo-sites may default to workload-centric, cluster-centric, or be specified by workload clients and/or cluster system administrators. In one example, priority if given to workload-centric preferred geo-sites.

Witness 640 is typically a storage device (e.g., "witness disk") or other type of device that is accessible to at least one online cluster node and that may be used by cluster 600 in maintaining quorum. Witness 640 may alternatively be a file share that is accessible to at least one online cluster node. Such a witness is also known as a "witness node" of a cluster and is considered a cluster node for purposes of maintaining quorum. For example, if a cluster system, such as cluster system 600, has an even number of online nodes, the system may establish a quorum configuration by using a witness node. In such cases, as long as the witness remains online (i.e., accessible to at least one online cluster node), the cluster can sustain failures of all but one of its nodes and continue to operate. If the witness goes offline, the same cluster can sustain failures of all but two of its. Thus, the witness allows for a worst-case situation where only one node remains operating in the cluster where the remaining node can access the witness. One method for maintaining quorum by a geo-site aware cluster system is presented in FIG. 5 and the corresponding written description.

Geo-site aware cluster system 600 typically utilizes cross-geo-site heartbeat messages to monitor communications between geo-sites. The exact format of the heartbeat messages is not particularly relevant here. Heartbeat messages are typically passed between geo-sites of a cluster at suitable intervals so as to evidence communication issues between geo-sites. This is different that conventional cluster heartbeat messages that are typically passed between subnets. In one example, a site-to-site communications status is determined based on cross-geo-site heartbeat messages. In this example, patterns of successful and dropped heartbeat messages are evaluated to determine degrees of degraded or failed cross-geo-site communications, which is then indicated by the site-to-site communication status. This status may also be influenced by evaluation of other cluster communications, such as global updated messages ("GUMs") and the like. Additionally or alternatively, such status may be determined for particular nodes between geo-sites, such as between nodes A-D, A-E, A-F, B-D, B-E, and B-F, etc.

CONCLUSION

In a first example, a method is performed on a cluster system comprising at least one computing device that includes at least one processor and memory, the method comprising: automatically identifying, by the cluster system, a plurality of geo-site objects that each indicate a subset of physical resources of the cluster system that is physically located at the corresponding geo-site; placing, by the cluster system, a workload of a client on a node of a geo-site object of the plurality of geo-site objects, where the geo-site object corresponds to a geo-site at which the client is located; and placing, by the cluster system, dependent storage of the workload on another node of the geo-site object.

In a second example, there is a cluster system comprising: a node that comprises at least one processor and memory couple to the at least one processor; a geo-site physical configuration manager ("GPCM") via which the cluster system identifies a plurality of geo-site objects that each indicate a subset of physical resources of the cluster system that is physically located at the corresponding geo-site; a geo-site virtual configuration manager ("GVCM") via which the cluster system places a workload of a client on the node that is of a geo-site object of the plurality of geo-site objects, where the geo-site object corresponds to a geo-site at which the client is located; and the GVCM via which the cluster system places dependent storage of the workload on another node of the geo-site object.

In a third example, at least one computer-readable medium that comprises computer-executable instructions that, based on execution by at least one computing device of a cluster system, configure the cluster system to perform actions comprising: automatically identifying, by the cluster system, a plurality of geo-site objects that each indicate a subset of physical resources of the cluster system that is physically located at the corresponding geo-site; placing, by the cluster system, a workload of a client on a node of a geo-site object of the plurality of geo-site objects, where the geo-site object corresponds to a geo-site at which the client is located; and placing, by the cluster system, dependent storage of the workload on another node of the geo-site object.

In the first, second, and third examples, the another node is the same as the one node; and/or the cluster system further places, upon a failover involving the workload, the workload on a third node of the geo-site object; and/or the cluster system further places, in response to a failback event involving the workload subsequent to the placing the workload on the third node, the workload back on the node; and/or the cluster system further identifies the geo-site object as a preferred geo-site; and/or the cluster system prunes some node in a geo-site object other than the geo-site object based on the some node not being in the geo-site object; and/or the node is identified by the cluster system as a preferred node.

The detailed description provided in this section, in connection with the many possible embodiments to which the invention and the forgoing examples may be applied, it should be recognized that the examples described herein are meant to be illustrative only and should not be taken as limiting the scope of the invention. Therefore, the invention as described herein contemplates all such embodiments as may come within the scope of the following claims and any equivalents thereto.

The invention claimed is:

1. A method performed on a cluster system comprising at least one computing device that includes at least one processor and memory, the method comprising:
   automatically identifying, by the cluster system, a plurality of geo-site objects, each of the geo-site objects corresponding to a geographical location and identifying a subset of physical resources of the cluster system that is physically located at the corresponding geographical location;
   determining a client geographical location at which a client is physically located;

placing, by the cluster system and based on the determination, a workload of the client on a workload node of a first geo-site object of the plurality of geo-site objects, where the first geo-site object identifies a subset of physical resources of the cluster system that is physically located at the client geographical location;

placing, by the cluster system, dependent storage of the workload on a storage node of the geo-site object, where the workload node and the storage node are cluster nodes of the cluster system; and pruning, based on a node not being in the geo-site object, the node from one of the plurality of geo-site objects other than the geo-site object.

2. The method of claim 1 where the storage node and the workload node are the same cluster node.

3. The method of claim 1 further comprising placing, upon a failover involving the workload, the workload on a third node of the geo-site object.

4. The method of claim 3 further comprising placing, in response to a failback event involving the workload subsequent to the placing the workload on the third node, the workload back on the workload node of the geo-site object.

5. The method of claim 1 further comprising identifying the geo-site object as representing a preferred geo-site of the cluster system.

6. The method of claim 1 where the workload node is identified by the cluster system as a preferred node of the cluster system.

7. A cluster system comprising:
a workload node that comprises at least one processor and memory coupled to the at least one processor, the memory comprising computer-executable instructions that, based on execution by the at least one processor, configure the cluster system to:
  identify a plurality of geo-site objects, each of the geo-site objects corresponding to a geographical location and identifying a subset of physical resources of the cluster system that is physically located at a corresponding geographical location of the cluster system;
  determine a client geographical location at which a client is physically located;
  place, based on the determination, a workload of the client on the workload node of a first geo-site object of the plurality of geo-site objects, where the first geo-site object identifies a subset of physical resources of the cluster system that is physically located at the client geographical location; and
  place dependent storage of the workload on a storage node of the geo-site object, where the workload node and the storage node are cluster nodes of the cluster system; and
a geo-site quorum mange via which the cluster system is configured to prune, based on a node not being in the geo-site object, the node from one of the plurality of geo-site objects other than the geo-site object.

8. The cluster system of claim 7 where the storage node and the workload node are the same cluster node.

9. The cluster system of claim 7 further configured to place, upon a failover involving the workload, the workload on a third node of the geo-site object.

10. The cluster system of claim 9 further configured to place, in response to a failback event involving the workload subsequent to the placing the workload on the third node, the workload back on the workload node of the geo-site object.

11. The cluster system of claim 7 further configured to identify the geo-site object as representing a preferred geo-site of the cluster system.

12. The cluster system of claim 7 where the workload node is identified by the cluster system as a preferred node of the cluster system.

13. At least one computer-readable medium that comprises computer-executable instructions that, based on execution by at least one computing device of a cluster system, configure the cluster system to perform actions comprising:
automatically identifying, by the cluster system, a plurality of geo-site objects, each of the geo-site objects corresponding to a geographical location and identifying a subset of physical resources of the cluster system that is physically located at the corresponding geographical location;
determining a client geographical location at which a client is physically located;
placing, by the cluster system and based on the determination, a workload of the client on a workload node of a first geo-site object of the plurality of geo-site objects, where the first geo-site object identifies a subset of physical resources of the cluster that is physically located at the corresponding geographical location;
placing, by the cluster system, dependent storage of the workload on a storage node of the geo-site object, where the workload node and the storage node are cluster nodes of the cluster system; and
pruning, based on a node not being in the geo-site object, the node from one of the plurality of geo-site objects other than the geo-site object.

14. The at least one computer-readable medium of claim 13 where the storage node and the workload node are the same cluster node.

15. The at least one computer-readable medium of claim 13, the actions further comprising placing, upon a failover involving the workload, the workload on a third node of the geo-site object.

16. The at least one computer-readable medium of claim 15, the actions further comprising placing, in response to a failback event involving the workload subsequent to the placing the workload on the third node, the workload back on the workload node of the geo-site object.

17. The at least one computer-readable medium of claim 13 where the geo-site object is identified by the cluster system as representing a preferred geo-site of the cluster system, or where the workload node is identified by the cluster system as a preferred node of the cluster system.

* * * * *